United States Patent [19]
Lauterbach

[11] 4,294,114
[45] Oct. 13, 1981

[54] APPARATUS FOR THE MEASUREMENT OF THE MASS OF A FLOWING MEDIUM

[75] Inventor: Heinz Lauterbach, Esslingen, Fed. Rep. of Germany

[73] Assignee: Robert Bosch GmbH, Stuttgart, Fed. Rep. of Germany

[21] Appl. No.: 96,113

[22] Filed: Nov. 20, 1979

[30] Foreign Application Priority Data

Apr. 1, 1979 [DE] Fed. Rep. of Germany ....... 2900210

[51] Int. Cl.³ .............................................. G01F 1/68
[52] U.S. Cl. ....................................................... 73/204
[58] Field of Search .................... 73/204, 116; 338/25, 338/28, 308

[56] References Cited
U.S. PATENT DOCUMENTS

| | | | |
|---|---|---|---|
| 3,677,085 | 7/1972 | Hayakaw | 73/204 |
| 3,900,819 | 8/1975 | Djorup | 73/204 |
| 4,214,478 | 7/1980 | Lauterbach | 73/204 |

Primary Examiner—Herbert Goldstein
Attorney, Agent, or Firm—Edwin E. Greigg

[57] ABSTRACT

An apparatus for measuring the mass of a flowing medium which utilizes a temperature—dependent resistor disposed in the flow of the medium. The temperature—dependent resistor includes a carrier and a resistor film disposed on the carrier. The temperature and/or resistance of the resistor film is governed by the mass of the flowing medium and serves as the basis for the generation of a manipulated variable which is a standard for the mass of the flowing medium. The apparatus also utilizes a preceding body aligned longitudinally with the carrier directly upstream of the carrier in the direction of the flow of the medium. The preceding body has a length such that a particular boundary layer state prevails about the temperature-dependent resistor and the heat-transfer coefficient of the resistor film is influenced in accordance with the mass of the flowing medium.

3 Claims, 2 Drawing Figures

APPARATUS FOR THE MEASUREMENT OF THE MASS OF A FLOWING MEDIUM

BACKGROUND OF THE INVENTION

The invention relates to an apparatus for the measurement of the mass of a flowing medium. An apparatus for the measurement of the mass of a flowing medium is already known in which a resistor film placed upon a carrier is used. The characteristic curve of such an apparatus, however, has such an unfavorable course that electronically very great expense is required for the processing of the measurement value.

OBJECT AND SUMMARY OF THE INVENTION

The apparatus in accordance with the invention has the advantage over the prior art in that the characteristic curve of the apparatus can be influenced by simple means in such a manner that a characteristic curve is produced which requires only limited electronic expense for processing the measurement value.

The invention will be better understood further objects and advantages thereof will become more apparent from the ensuing detailed description of a preferred embodiment taken in conjunction with the drawings.

DESCRIPTION OF THE PREFERRED EMBODIMENTS

Figure 1:
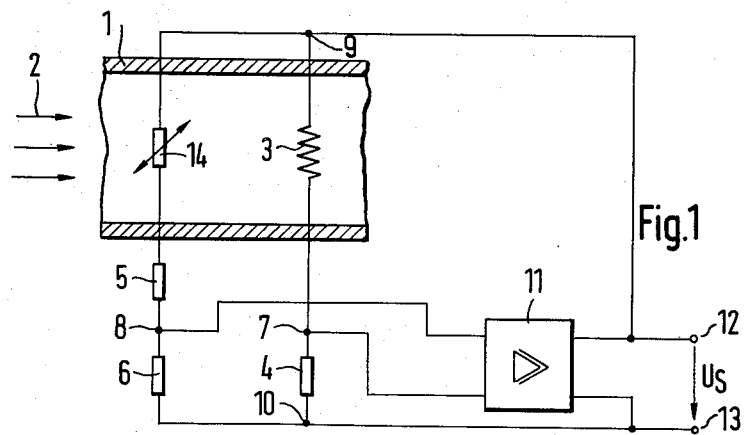
FIG. 1 is a schematic diagram of a basic circuit for an apparatus used to measure the mass of a flowing medium having a temperature-dependent resistor.

Referring now to FIG. 1, there is shown an intake manifold 1 of an internal combustion engine (which is not further illustrated) into which the air induced by the engine flows in the direction indicated by the arrows 2. A temperature-dependent resistor 3, such as a hot-film resistor, is located in the intake manifold 1 and is subjected to the output value of a controller and simultaneously furnishes the input value for the controller. The temperature of the temperature-dependent resistor 3 is controlled to a fixed value which is above the average air temperature. If the flow velocity—that is, the quantity of air induced per unit of time—increases, then the temperature-dependent resistor 3 cools to a greater extent. This cooling is fed back to the input of the controller, so that the controller increases its output value in such a manner that the set temperature value is again established at the temperature-dependent resistor 3.

The output value of the controller governs the temperature of the temperature-dependent resistor 3, in accordance with variations in the induced air quantity, to the predetermined value and simultaneously represents a standard for the induced air quantity, which is delivered as a measurement value to a metering circuit in order to adapt the required quantity of fuel to the quantity of air induced per unit of time.

The temperature-dependent resistor 3, together with a resistor 4, comprises a first bridge arm, which has a second bridge arm connected parallel therewith comprising the two fixed resistors 5 and 6. Between the resistors 3 and 4, there is the pickup point 7, while the pickup point 8 is located between the resistors 5 and 6. The two bridge arms are connected in parallel at points 9 and 10.

The diagonal voltage of the bridge appearing between points 7 and 8 is applied to the input of an amplifier 11, to the output terminals of which the points 9 and 10 are connected, so that the output value of the amplifier 11 supplies the bridge with operational voltage or operational current. The output value, designated from henceforth as the manipulated variable $U_S$, can be picked up between the terminals 12 and 13, as indicated in FIG. 1. The manipulated variable $U_S$ controls the metering of the fuel required for the induced air in a fuel metering circuit (not illustrated) of the engine.

The temperature-dependent resistor 3 is heated up by the air flow passing through it, up to a value at which the input voltage of the amplifier 11, that is, the bridge diagonal voltage, becomes zero or assumes a predetermined value. From the output of the amplifier 11, a specific current flows into the bridge circuit. If the temperature of the temperature-dependent resistor 3 varies as a result of a variation in quantity of the induced air, then the voltage varies at the bridge diagonal, and the amplifier 11 governs the bridge supply voltage or the bridge current to a value for which the bridge is again balanced or is out of balance in a predetermined manner.

The output value of the amplifier 11, the control voltage $U_S$, thus represents a standard for the induced air quantity, just as does the current in the temperature-dependent resistor 3.

In order to compensate for the influence of the temperature of the induced air on the measurement results, it may be advantageous to include a second resistor 14, surrounded by a flow of induced air, in the second bridge arm. In so doing, the dimension of the resistors 5, 6 and 14 must be chosen such that the output loss of the temperature-dependent resistor 14, which is generated by the bridge arm current flowing through it, is so small that the temperature of this resistor 14 does not vary practically with the variations in the bridge voltage, but rather always corresponds to the temperature of the induced air flowing past it.

Figure 2:
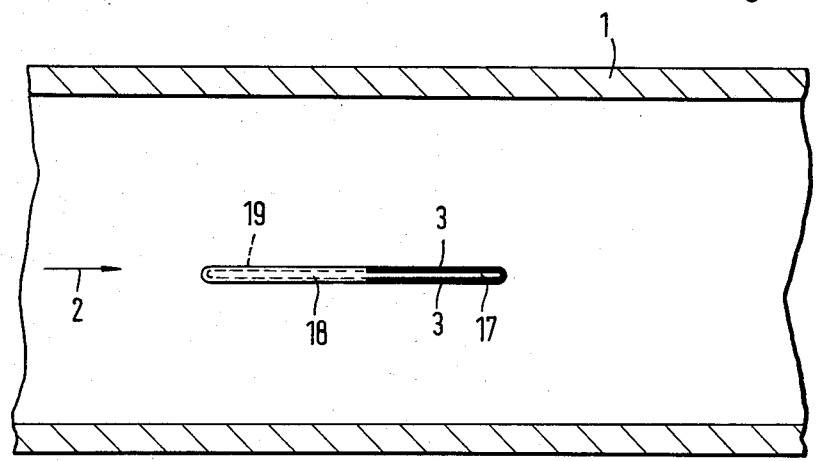
FIG. 2 is a sectional view of a temperature-dependent resistor in accordance with the invention arranged in an apparatus for the measurement of the mass of a flowing medium.

As is shown in FIG. 2, the temperature-dependent resistor 3 may be formed as a resistor film, which is placed upon a carrier 17 in accordance with any known process. If the carrier 17 is made of an electrically conductive material, then an insulating layer is provided between the resistor film 3 and the carrier 17. The carrier 17 is formed in an oblong configuration, preferably plate-like, and extends in the flow direction. Directly upstream of the carrier 17, and in alignment therewith, there is a preceding body 18 disposed in the flow cross section and having approximately the same cross section as the carrier 17. The preceding body 18 may also be part of the carrier 17.

A further resistor film 19 electrically insulated from the temperature-dependent resistor 3 may be placed on the body 18, as indicated in FIG. 2 by broken lines. This further resistor film 19 is also exposed to the flow and maintained at approximately the same temperature as the temperature-dependent resistor film 3, so that the body 18 and the carrier 17 have approximately the same temperature as the temperature-dependent resistor film 3.

The heating of the carrier 17 by means of the further resistor film 19 produces the effect of eliminating any temperature drop between the temperature-dependent resistor film 3 and the carrier 17, so that the temperature-dependent resistor film 3 can react rapidly to changes in the mass of the medium, without any delay in the measurement at first caused by a temperature equalization between the carrier 17 and the temperature-dependent resistor film 3. Without the heating of the carrier 17, in accordance with the embodiment of FIG. 2, there would be different running lengths on the part of the temperature boundary layer and the flow boundary layer, with higher heat-transfer coefficients appearing at the beginning of the temperature boundary layer. With the described heating, the temperature boundary layer and flow boundary layer coincide.

Because of given physical properties, the local heat-transfer coefficient of a body disposed in the flow of a medium formed in a plate-like configuration and exposed to the flow along its length drops off very sharply when there is not yet a boundary layer in the flow direction. The state of formation of a boundary layer depends not only on the length in the flow direction of the plate-like body, but also on the Reynolds number, which is also dependent on the velocity. With increasing flow velocity, a point having a particular boundary layer state in which, for example, the flow is changing over from laminar flow to turbulent flow, is displaced counter to the direction of the flow.

If the preceding body 18 is disposed upstream of the carrier 17 and in alignment therewith, then by means of an appropriate selection of the length of the body 18 in the flow direction, a particular boundary layer state for certain flow velocity ranges in the region of the temperature-dependent resistor film 3 on the carrier 17 prevails. Such a state results in a particular desired, average heat-transfer coefficient which affects the result of measurement, and thus the characteristic curve of the apparatus, in a desired manner. A further possibility for influencing the boundary layer state and thus the average heat-transfer coefficient in the region of the temperature-dependent resistor film 3, as a result of which the characteristic curve of the apparatus can be influenced, results from the application of the further resistor film 19 to the body 18.

The foregoing relates to a preferred exemplary embodiment of the invention, it being understood that other embodiments and variants thereof are possible within the spirit and scope of the invention, the latter being defined by the appended claims.

What is claimed and desired to be secured by Letters Patent of the United States is:

1. In an apparatus for measuring the mass of an air induced mass into an internal combustion engine, having at least one temperature-dependent resistor disposed in the flow of the medium, the temperature-dependent resistor including: a carrier; and a resistor film disposed on the carrier and in the flow of the medium, the temperature and/or resistance of the resistor film being governed by the mass of the flowing medium, and serving as the basis for the generation of a manipulated variable which is a standard for the mass of the flowing medium, the improvement comprising:

a preceding body having approximately the same cross-section as that of the carrier, said carrier extending longitudinally in the direction of the flow of the medium at least a portion of said resistor film disposed along said longitudinal direction, and said preceding body being aligned with the carrier directly upstream thereof in the direction of the flow of the medium, and having a length in the direction of the flow of the medium such that a particular boundary layer state prevails about the temperature-dependent resistor and the heat-transfer coefficient of the resistor film is influenced by the preceding body in accordance with the mass of the flowing medium.

2. An apparatus in accordance with claim 1, wherein said preceding body is part of said carrier.

3. An apparatus in accordance with claim 1, including a further resistor film applied to said preceding body which is electrically insulated from the temperature-dependent resistor film applied to said carrier, and wherein the further resistor film can be maintained at approximately the same temperature as said temperature-dependent resistor film.

* * * * *